No. 837,202. PATENTED NOV. 27, 1906.
W. H. DOWNING.
ROTARY ENGINE.
APPLICATION FILED MAY 10, 1906.

Witnesses:
C. J. Belt
L. E. Money

Inventor:
William H. Downing
By Taber & Whitman Co
Attorneys.

No. 837,202. PATENTED NOV. 27, 1906.
W. H. DOWNING.
ROTARY ENGINE.
APPLICATION FILED MAY 10, 1906.

Witnesses:
C. J. Bell
L. E. Money

Inventor
William H. Downing
By Taber & Whitman Co.
Attorneys.

No. 837,202. PATENTED NOV. 27, 1906.
W. H. DOWNING.
ROTARY ENGINE.
APPLICATION FILED MAY 10, 1906.

Witnesses:
C. T. Belt
L. E. Money

Inventor:
William H. Downing
By Taber & Whitman Co.
Attorneys.

No. 837,202. PATENTED NOV. 27, 1906.
W. H. DOWNING.
ROTARY ENGINE.
APPLICATION FILED MAY 10, 1906.

Witnesses:
C. T. Belt
L. E. Money

Inventor.
William H. Downing
By
Taber & Whitman Co.
Attorneys.

No. 837,202. PATENTED NOV. 27, 1906.
W. H. DOWNING.
ROTARY ENGINE.
APPLICATION FILED MAY 10, 1906.

Witnesses:
C. J. Bell
L. E. Money

Inventor
William H. Downing
By
Taber & Whitmarsh
Attorneys

No. 837,202. PATENTED NOV. 27, 1906.
W. H. DOWNING.
ROTARY ENGINE.
APPLICATION FILED MAY 10, 1906.

No. 837,202. PATENTED NOV. 27, 1906.
W. H. DOWNING.
ROTARY ENGINE.
APPLICATION FILED MAY 10, 1906.

Witnesses:
C. J. Belt
L. E. Money

Inventor.
William H. Downing
By Faber & Whitman Co.
Attorneys.

No. 837,202. PATENTED NOV. 27, 1906.
W. H. DOWNING.
ROTARY ENGINE.
APPLICATION FILED MAY 10, 1906.

Witnesses:
C. T. Belt
L. E. Money

Inventor:
William H. Downing
By
Taber & Whitman Co.
Attorneys.

UNITED STATES PATENT OFFICE.

WILLIAM H. DOWNING, OF PARKERSBURG, WEST VIRGINIA, ASSIGNOR OF ONE-HALF TO JOHN W. SOLLEY, OF PARKERSBURG, WEST VIRGINIA.

ROTARY ENGINE.

No. 837,202.   Specification of Letters Patent.   Patented Nov. 27, 1906.

Application filed May 10, 1906. Serial No. 316,150.

*To all whom it may concern:*

Be it known that I, WILLIAM H. DOWNING, a citizen of the United States, residing at Parkersburg, in the county of Wood and State of West Virginia, have invented certain new and useful Improvements in Rotary Engines, of which the following is a specification.

This invention relates to rotary engines, and pertains especially to the class of such engines employing a rotary piston having blades coöperating with gates slidable in the path of the blades.

The prime object of the invention is to provide an engine of such novel and peculiar construction in the matter of controlling induction and exhaust that much greater power is attained from a certain steam-pressure than in other engines of the same type using the same pressure.

A further object of the invention is to provide in a rotary engine a peculiar arrangement of induction and exhaust ports, to provide each port with a controlling-valve, to provide certain mechanism operated from the piston-shaft to work the induction-valves, and to provide certain hand-lever-reversing mechanism.

The object still further of the invention is to provide novel and peculiar mechanism carried by the engine-shaft to operate the slidable gates during the running of the engine in either direction and to permit the engine to be reversed at any point of its revolution without lost motion or stoppage of the engine.

The object still further of the invention is to provide certain mechanisms revoluble by and with the piston and its shaft, one set of said mechanism to operate the induction-valves automatically and the other set to operate the gates simultaneously with said valves.

The object still further of the invention is to provide in a rotary engine a series of induction-valves arranged in pairs, a slidable gate between the valves of each pair, a set of double cam-levers one of which is connected to each induction-valve, a series of arms attached to the engine-shaft and revolved by it for automatically operating the cam-levers, a follower for each gate, and means carried and revolved by the engine-shaft to operate the followers.

Other objects and advantages are attainable in the practical application of the engine resulting in the saving of fuel and motive power and the expeditious utility of the latter for driving various machinery.

In the accompanying drawings, forming part of this application, Fig. 1ᵃ is a detail top view of a pair of followers, partly broken away. Fig. 14ᵃ is a face view of the compound ring. Fig. 17ᵃ is a section on the line *g g*, Fig. 16.

The same reference-numerals denote the same parts throughout the several views of the drawings.

The body of the engine preferably consists of three parts, as shown—viz., the solid rotary piston 1, having a shaft $1^a$, the cylinder 2, and the side casing formed by the casing-plates 3 and 4. The casing, piston, and cylinder form the steam-chamber 5. The cylinder has three sets of induction-ports 6, arranged in pairs with a slot 7 between the ports of each pair, in which a sliding gate 8 is operated. Between each pair of said ports is a pair of exhaust-ports 9. The outer periphery of the cylinder is composed of three lugs 10, through which the gate-stems 11 extend, a series of faces 12, to which the induction-valves 13 are attached, and a series of flanges 14, to which the exhaust-valves 15 are secured. Three of the induction-valves 13 are connected together on one side of the engine by steam-pipes 16, and the other three induction-valves are connected together on the reverse side of the engine by pipes 17, one of each set of valves being connected to a steam-pipe 18 from a boiler by a pipe-coupling 19 containing a valve 20 and having branch pipes 21 leading to the induction-valves. Secured to the valve 20 is a reversing hand-lever 22, connected to an arm 23 of one of the exhaust-valves 15 on one side of the engine by a link 24. The other of the exhaust-valves on this side of the engine are connected together and to the lever-valve on said engine side by levers 25 and 26, and like levers 27 and 28 connect the valves on the reverse side of the engine together and to an arm 29, the latter being connected to the hand-lever 22 by a link 30, so that the valve 20 and all of the exhaust-valves are worked by the lever 22 to reverse the engine. Certain of the exhaust-valves have a leading-off pipe 31, and pipes $31^a$ connect these valves together. The induction-valves are worked by cam-levers 32, connected to the valves by links 33, and the levers 32 are operated by arms 34, having a head 35, and by cut-off arms 36, a set of said cam-levers and arms being secured to the shaft $1^a$ upon both sides of the engine.

The cam-levers 32 being all of the same construction, only one of them will be described in detail. It is pivoted at 37 and has cams 38 and 39, between which the arm-heads 35 work to open the induction-valve. A cut-off 40, having a compound curved slot 41, is slidably connected to each lever 32 by a pin 42. The cut-offs 40 are connected together by slotted bell-crank levers $40^a$ and are operated by a hand-lever 43, connected to the cut-offs 40 on each side of the engine, Figs. 22 and 26. It will be seen that the cut-offs 40 may be slid into engagement with the cut-off arms 36 to operate the cam-levers 32 as occasion may demand, the levers 32 being governed in their outward movement by stop-pins 44.

Two of the induction-valves 13 are connected to the valve 20 by branch pipes 21. With this exception all of the induction-valves are alike. Therefore only one of the said valves 13 will be described in detail. (See Fig. 10.) It has a pipe-stem 45 extending partly around its casing 46 and connected to the branch pipe 21 by an angle-coupling 47. It has steamways 48, leading into apertures 49 made through the casing, the latter having a steam-passage 50 leading into the cylinder-port 6. The movable part 51 of the valve has ports 52, which allow continuous steam-pressure into the valve-chamber 53, and a port 54 coöperating with the port 50 to carry steam from the chamber 53 through the port 50, the stem 55 of the valve being connected to the cam-lever link 33.

Figure 24:
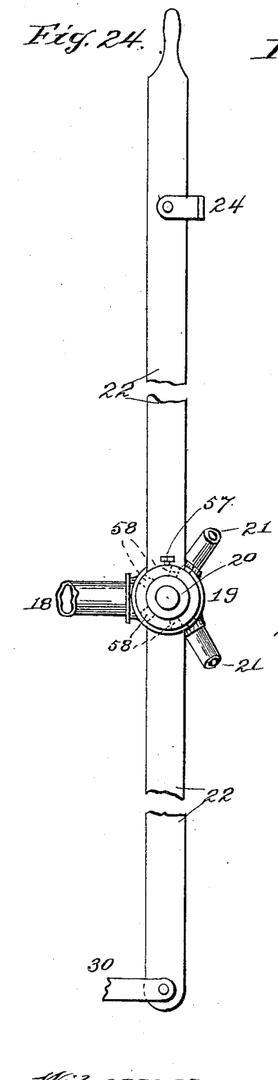
Fig. 24 is a detail side view of the reversing-levers and the supply-valve controlled by the hand-lever with the pipes leading to the induction-valves partly broken away.
Figure 25:
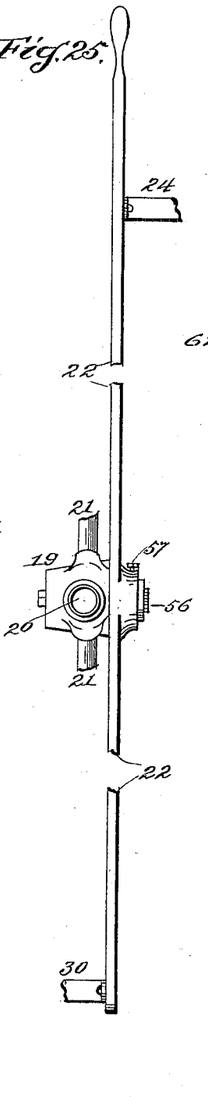
Fig. 25 is an edge view of the levers shown in Fig. 24.

As shown particularly in Figs. 24 and 25 of the drawings, the valve 20 has the lever 22 secured to its stem 56 by a set-screw 57, and its ports 58 may be positioned to induct steam from the pipe 18 to either of the branches 21 in reversing the engine by moving the lever 22, and the latter may be positioned as desired to stop the engine.

Figures 1, 1A, 23:
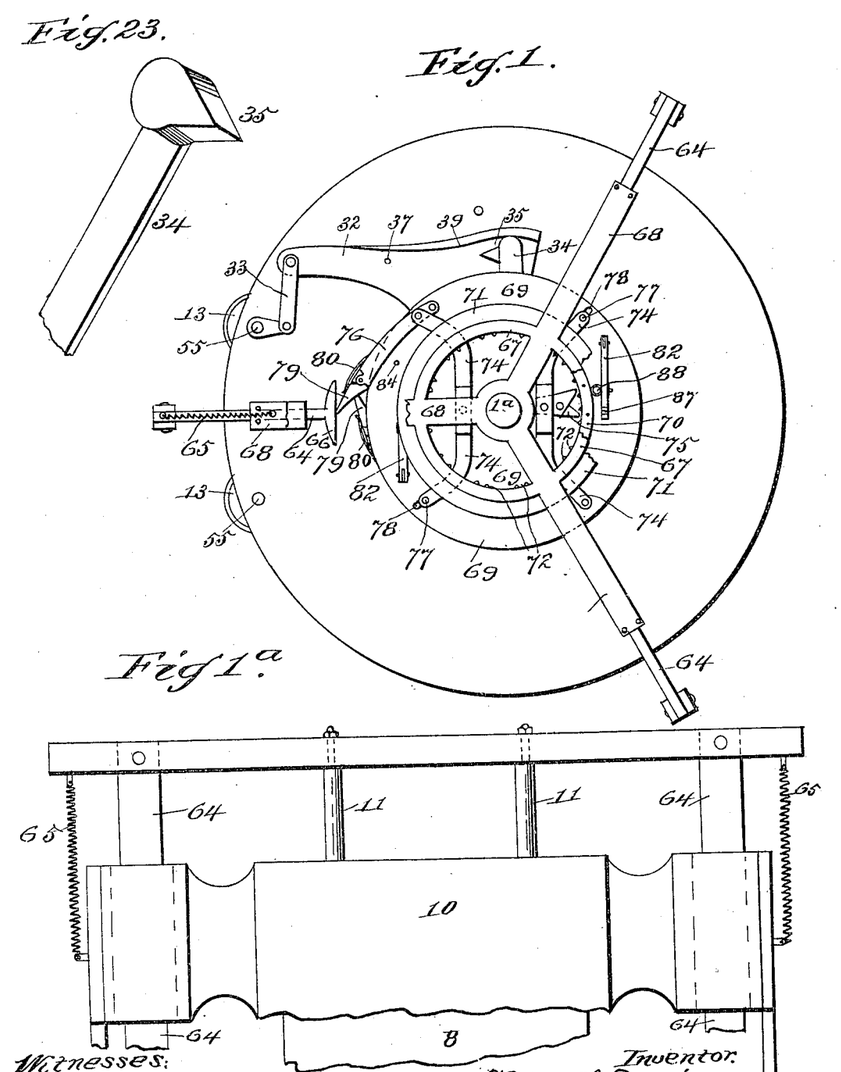
Figure 1 is an elevation looking at the side of the engine and showing only one pair of swinging arms, one pair of induction-valves, and the gate between them, and one cam-lever, with the exhaust-valves, pipes, and levers removed.
Fig. 23 is a detail perspective view of one of the arm-heads.
Figure 2:
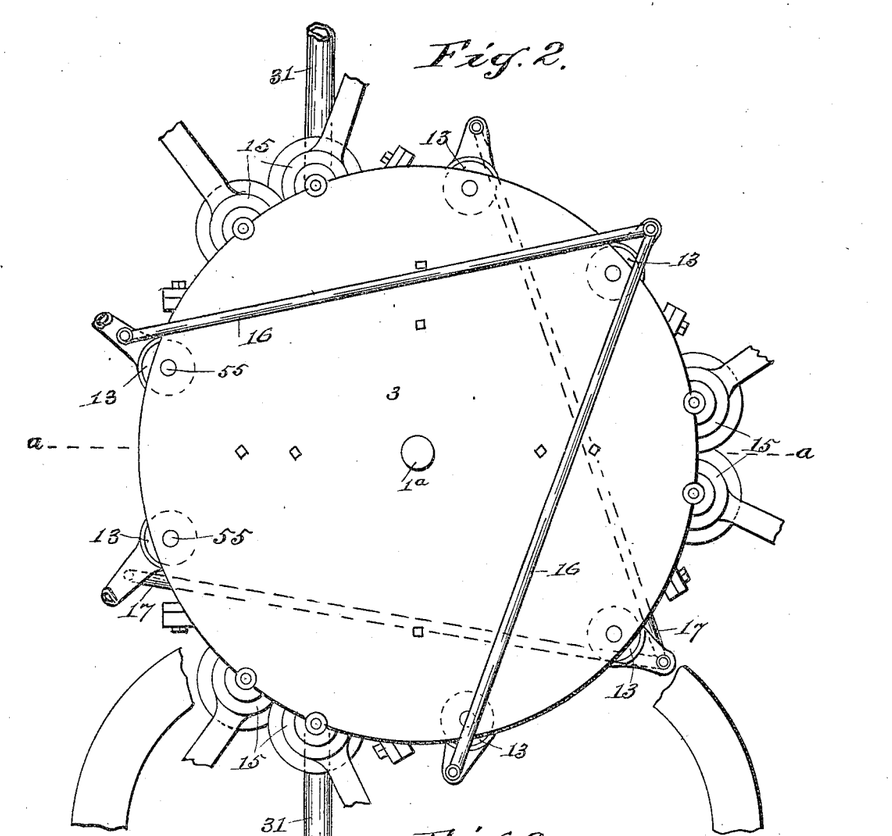
Fig. 2 is a side elevation showing the induction-valves and their connecting-pipes with the exhaust-pipes broken away and the remainder of the engine parts removed.
Figure 3:
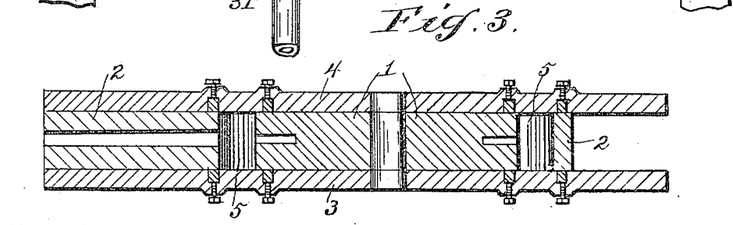
Fig. 3 is a section of the casing, piston, and cylinder, on the line *a a*, Fig. 2.
Figures 4, 8, 9:
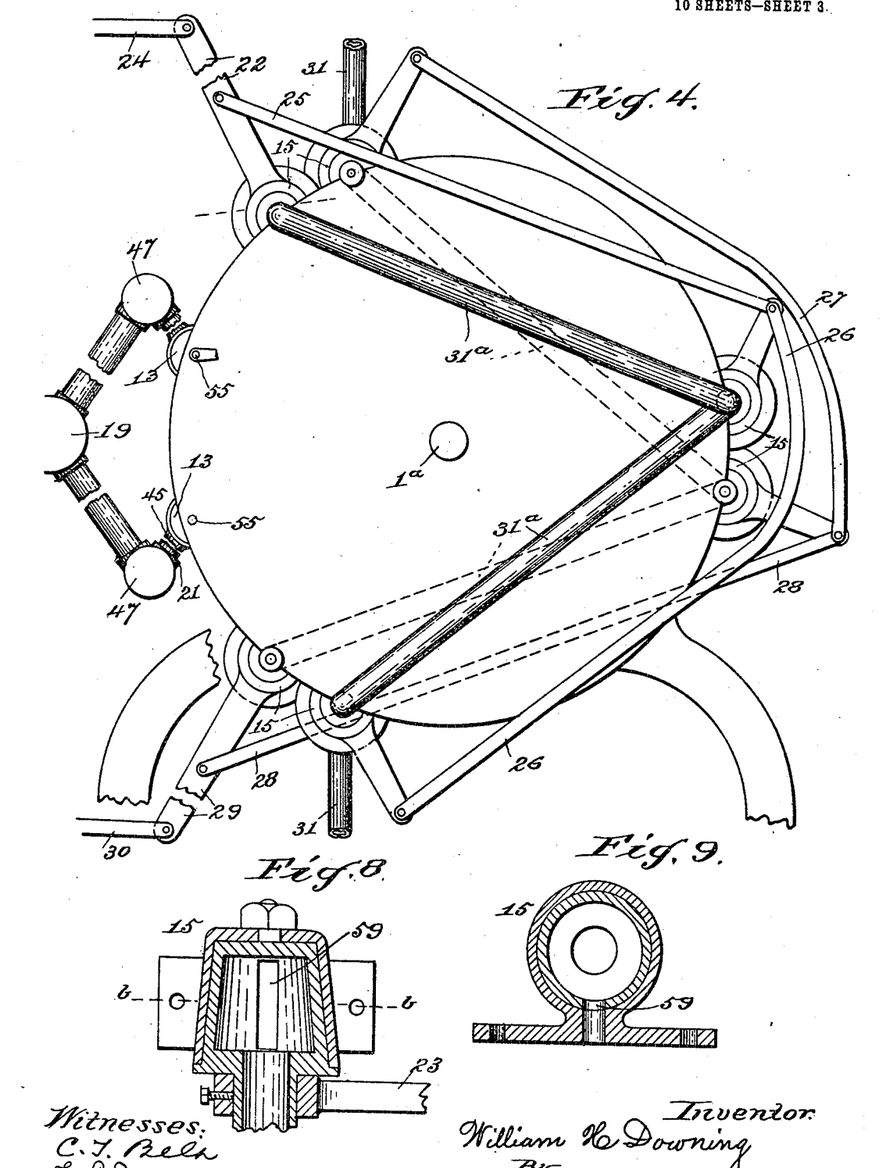
Fig. 4 is a side elevation showing the exhaust-valves and their connecting pipes and levers with the hand-levers broken away.
Fig. 8 is a detail section on the line *y y*, Fig. 4.
Fig. 9 is a section on the line *b b*, Fig. 8.
Figure 5:
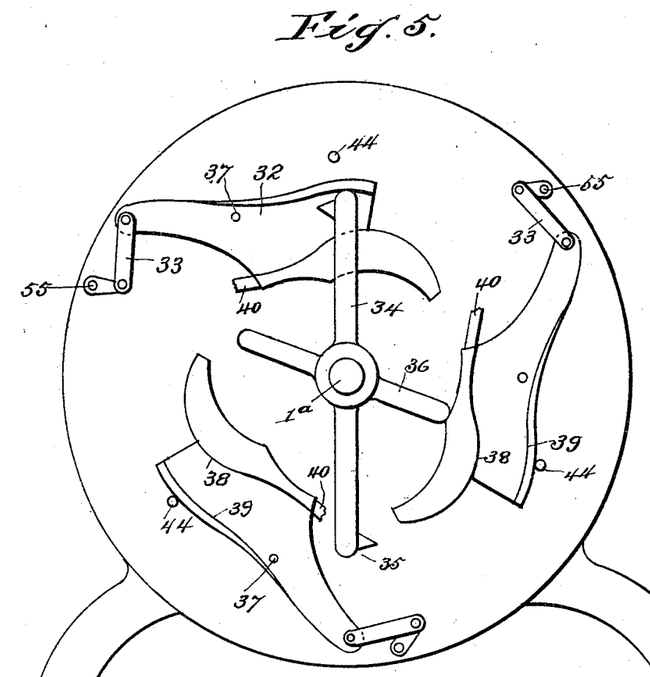
Fig. 5 is a side elevation showing the application of the cam-levers and shaft-arms for operating them.
Figure 6:
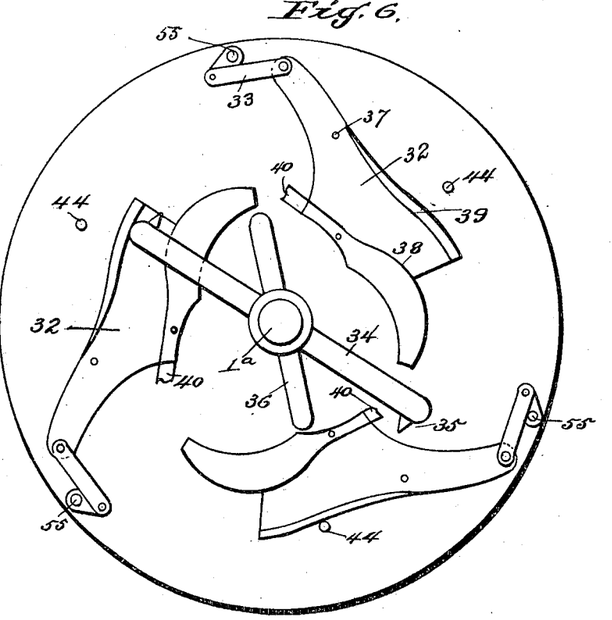
Fig. 6 is a similar view showing the position of the parts on the reverse side of the engine.

The exhaust-valves 15 are all alike, and each one has a single port 59, as shown in Figs. 8 and 9.

Figure 18:
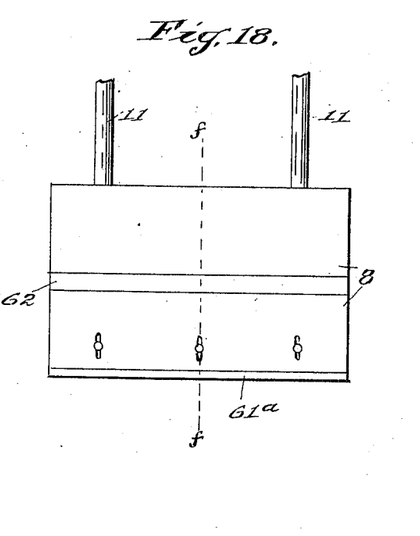
Fig. 18 is a detail elevation of one of the gates.
Figure 19:
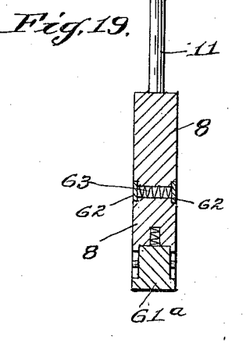
Fig. 19 is a section on the line *f f*, Fig. 18.
Figure 20:
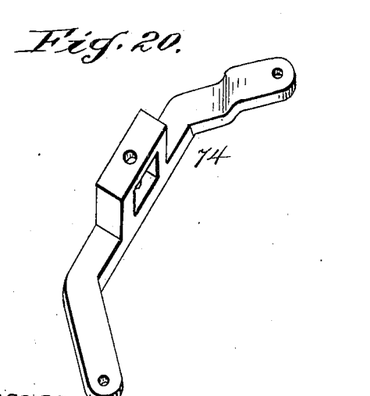
Fig. 20 is a perspective view of one of the yokes.
Figure 21:
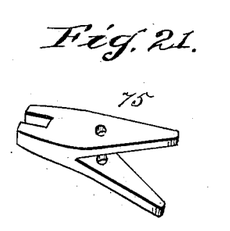
Fig. 21 is a perspective view of the double dog.

The piston-blades 60 have cushioned ends and are pressed outwardly by suitable spiral springs 61. The gates 8, Figs. 18 and 19, have cushioned ends $61^a$ and side packing-plates 62, with spiral springs 63 between them. Each gate 8 is connected to a follower 64 upon the outer sides of the engine, and each follower is controlled by a spiral spring 65. The inner end of the follower 64 has a shoe 66.

Figures 11, 12, 13, 14:
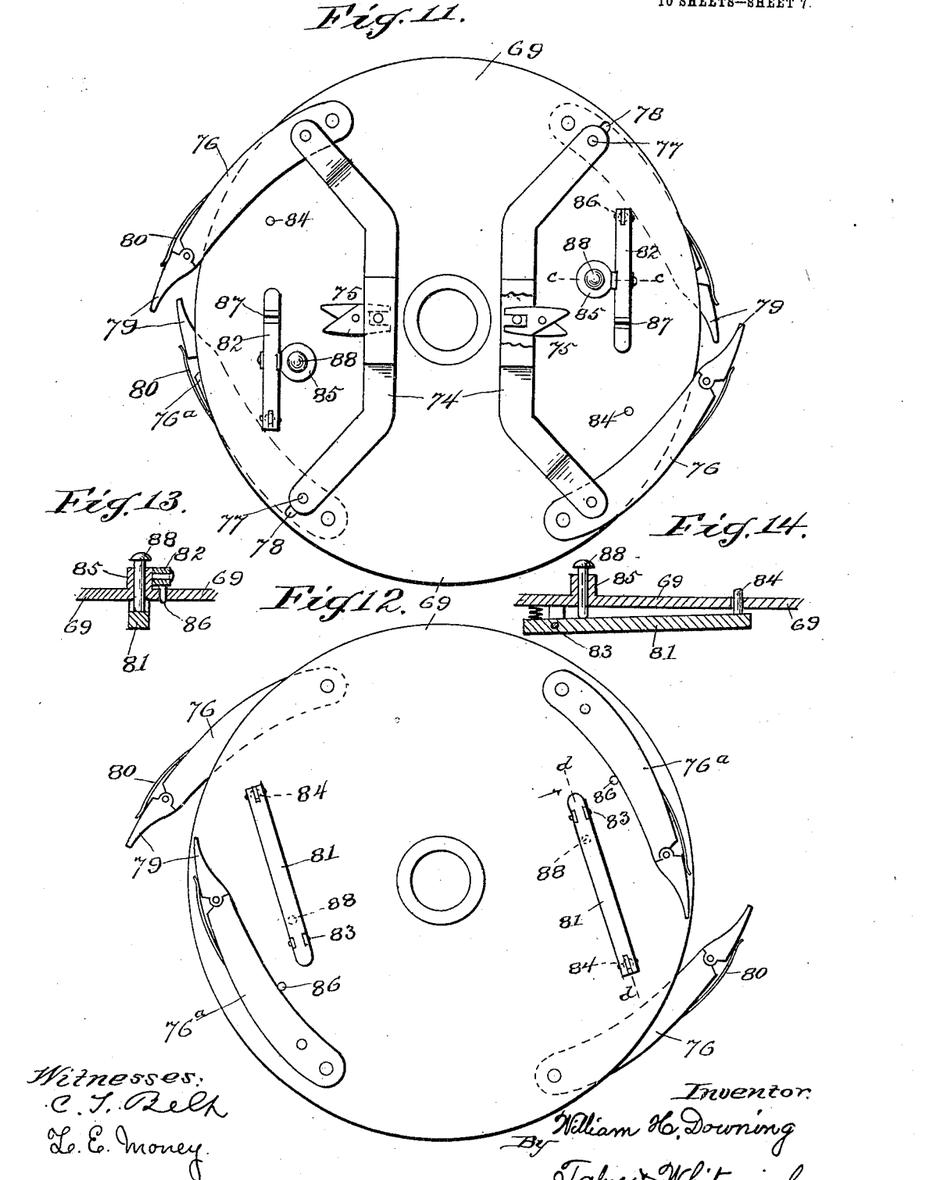
Fig. 11 is a detail elevation of one of the shaft-disks and the parts carried by it.
Fig. 12 is a similar view looking at the inner side of this disk, showing arms extended and retracted to their limit.
Fig. 13 is a section on the line *c c*, Fig. 11.
Fig. 14 is a section on the line *d d*, Fig. 12.
Figure 14A:
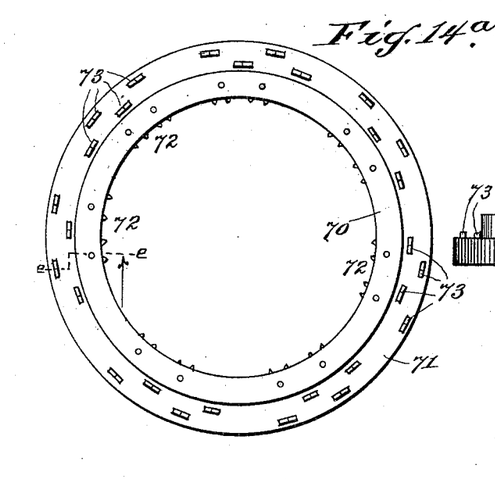
Figure 15:
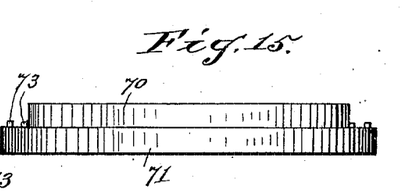
Fig. 15 is an edge view of the compound ring.
Figure 16:
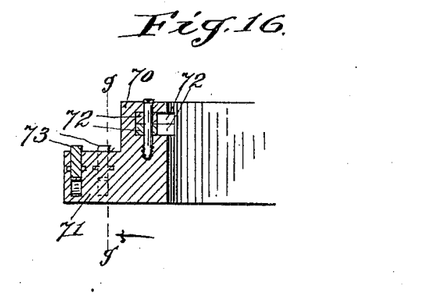
Fig. 16 is an enlarged section on the line *e e*, Fig. 14ᵃ.
Figure 17:
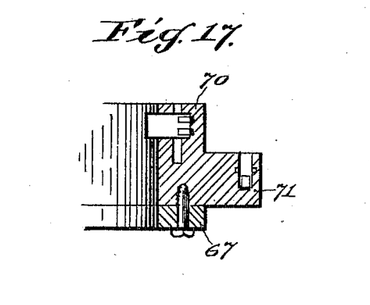
Fig. 17 is a detail sectional view of a portion of the ring without pawls therein.
Figure 17A:
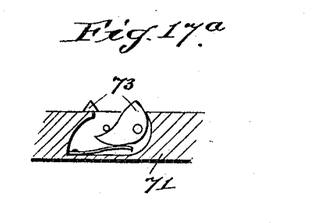

To effect withdrawal of the gates from the steam-chamber simultaneously with the piston-blades reaching the gates and to permit the return of the gates to said chamber simultaneously with the passage of the blades, I have the shaft $1^a$ revolve in the hub of circular brackets 67, having arms 68 to fix them, one on each side of the engine, a disk 69 on each side of the engine and secured to the shaft, and the disks and brackets are provided with the following-described coöperating mechanism or devices for operating the followers 64, Figs. 11 and 12. Said mechanism and devices being duplicated in sets on each side of the engine, only one set will be hereinafter described in detail. The bracket 67 is provided with a compound ring or two rings 70 and 71 at an angle one to the other. The ring 70 has a series of spring-controlled pawls 72, arranged together in pairs, and the ring 71 has like pawls 73, arranged separately in pairs and working at right angles to the movement of the pawls 72. These pawls 72 and 73 constitute trip devices and are positioned in line with the followers 64 and operate the mechanism carried by the disks 69 as the latter are revolved by the shaft 1ª. Two yokes 74 are hung each on a double-faced dog 75. One end of the yokes is pivoted to a swinging arm 76, which is pivoted to the disk 69, on one side thereof, and the other yoke end has a stud 77, working through a slot 78 in the disk and connects a like arm 76ª, pivoted on the other, or inner, side of the disk with the yoke.

The free end of the arms 76 and 76ª have an outwardly-swinging finger 79, controlled by a plate-spring 80. The arms are controlled in their outward movement by the yokes 74, and in their inward movement they are controlled by spring-levers 81 and 82. The levers 81 are pivoted at 83 on the back face of the disk 69 and have a stop-pin 84, working through the disk 69 to engage the arms 76 on the front side of the disk. The levers 82 are pivoted to posts 85 on the front face of the disk and have at one end a stop-pin 86, working through the disk to engage the arms 76ª on the back face of the disk, and the other end is provided with a lug 87. The post 85 has a push-pin 88, working through the disk to operate the levers 81 on the back face of the disk and their stop-pins 84. Said push-pin is operated by certain of the ring-pawls 73, and the other of said pawls 73 are engaged by the lever-lug 87 to operate the levers 82 and their pins 86.

With the engine running in either direction one pair of arms 76 is held in raised or extended position by the stop-pin 84 of the lever 81, with the other of said arms in retracted position until after the push-pin 88 engages one of the ring-pawls 73, which operates the lever 81 to withdraw its stop-pin 84 from behind said raised arm. Then the double dog strikes one of the ring-pawls 72 to slide the yoke 74, which retracts the said extended arm and pushes the other of said arms outwardly with its finger against the follower-shoe, the stop-pin 86 of the lever 82 being in the meantime withdrawn from behind said pushing-arm, allowing the latter and its finger to fall away from the shoe simultaneously with the finger of the other arm engaging the said shoe. This gives the follower its full outward stroke, and when the fingers are both clear of the shoe the follower is retracted by its spiral spring. This operation is automatic with each set of arms and levers, as they are rotated by the disk in passing each of the followers, and as a follower is connected to each gate the movement of the followers is imparted to the gates. It will be observed that while the arm-fingers are passing over the follower-shoe the gate is out of the steam-chamber and the piston-blade is passing the gate.

Figures 22, 28:
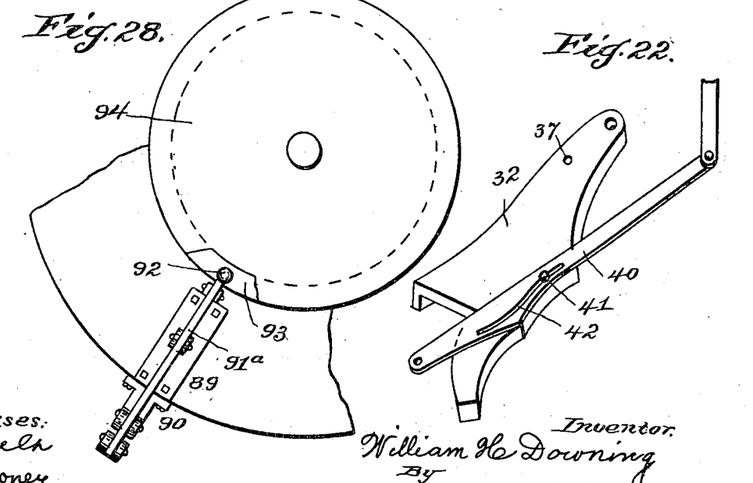
Fig. 22 is a detail perspective view of one of the cam-levers and its cut-off.
Fig. 28 is a face view of what is shown in Fig. 29, partly broken away.
Figure 26:
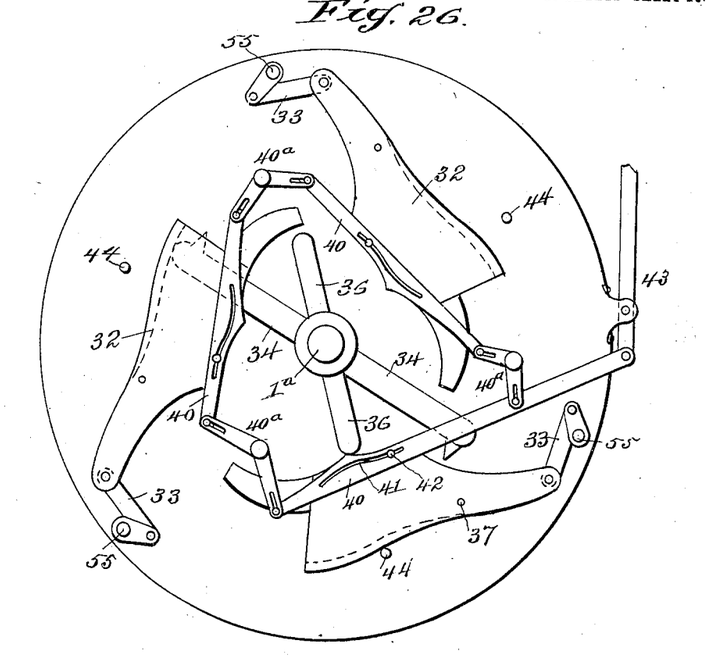
Fig. 26 is an elevation looking at rear side of the cam-levers, showing the cut-off connected together and to the cam-levers.
Figures 27, 29:
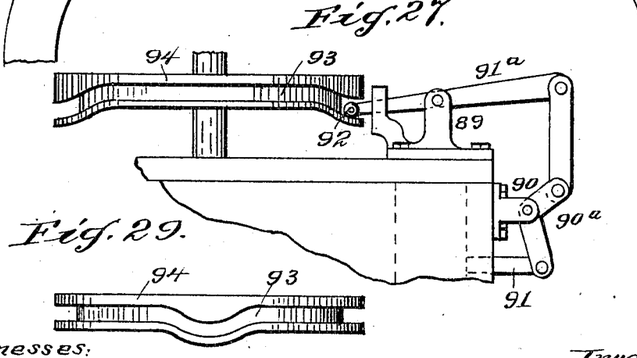
Fig. 27 is an elevation showing a modification.
Fig. 29 is an edge view of the wheel shown in Fig. 27.

Referring to the modification shown in Figs. 26 and 28, hangers 89 are secured to each face of the engine, and hangers 90 and levers 90ª, which are connected to the gate-stem 91 and operated by fulcrum-arms 91ª, having ball ends 92, working in a peripheral groove 93 of cam-wheels 94, secured to the engine-shaft to operate the gates.

Figures 7, 10, 30:
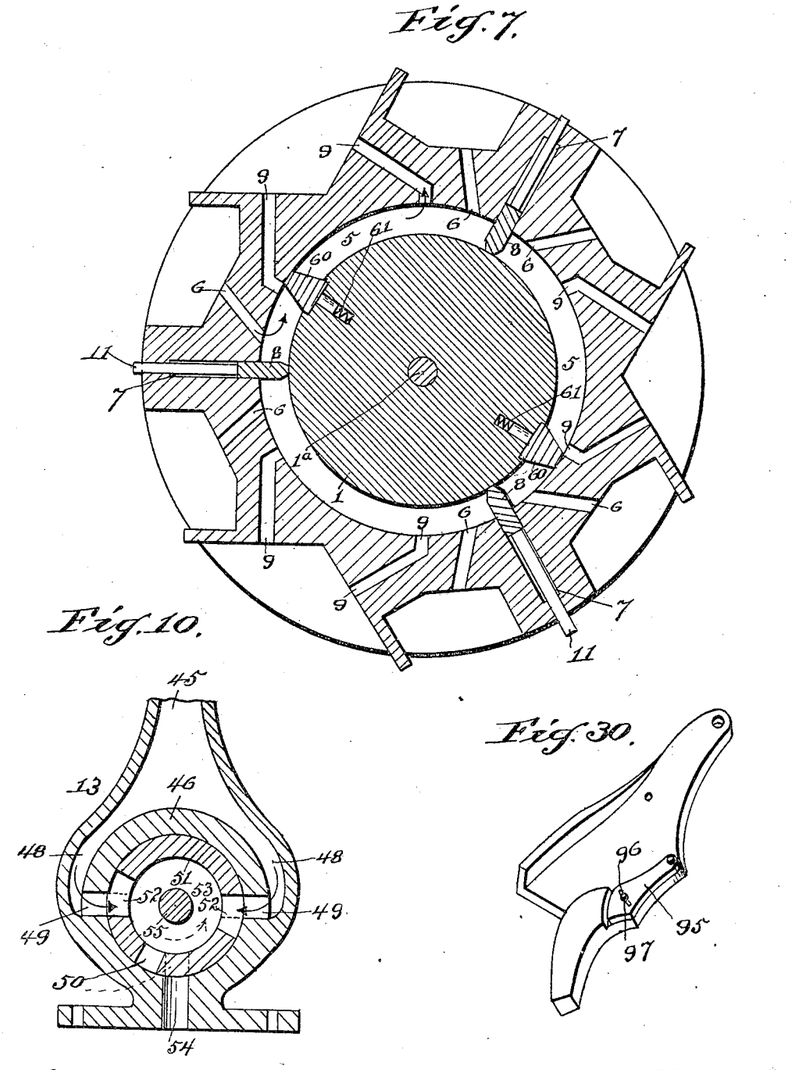
Fig. 7 is a vertical transverse section of the piston, gates, and steam-cylinder, showing the various ports.
Fig. 10 is a detail cross-section of one of the induction-valves.
Fig. 30 is a perspective view of a modified cut-off.

Referring to the modification shown in Fig. 30, a segmental cam 95 is pivoted to the cam-levers and adjustable by means of the slot 96 and set-screw 97 to vary the cut-off, and this cam is engaged by the cut-off arms to close the valve.

Having thus described my invention, what I claim as new, and desire to secure by Letters Patent, is—

1. The combination, with the cylinder provided with a series of peripheral faces having induction-ports leading from said faces into the cylinder-chamber, a series of flanges on the periphery of the cylinder, and exhaust-ports leading from said chamber through the flanges, of the induction-valves secured to the said faces, the exhaust-valves secured to said flanges, a supply-valve common to all the induction-valves, cam-levers connected to the induction-valves, and two sets of arms secured to the shaft on each side of the cylinder to operate the cam-levers.

2. The combination, with the cylinder, and the rotary piston, of the induction-valves certain of which have a steam-circuit on one side of the engine and the other of which have a steam-circuit on the reverse side of the engine, a supply-valve common to all the induction-valves, the levers connecting each set of these valves, and a reversing-lever carried by the supply-valve and common to both sets of said valves.

3. The combination, with the cylinder, and the rotary piston, of the induction-valves under steam-circuit in sets on each side of the cylinder, the exhaust-valves connected together on each side of the cylinder in sets, a supply-valve common to all the induction-valves, independent levers connecting together each set of induction-valves, levers connecting the exhaust-valves in sets, and a reversing-lever carried by the said supply-valve and connected with two of the induction-valves and with two of the exhaust-valves.

4. In a rotary engine, the combination, with a revoluble piston secured to a suitable shaft extending through the engine-cylinder, a series of arms secured to the shaft on each side of the cylinder, and the induction-valves, of the cam-levers pivoted to the cylinder and connected to said valves for operating them.

5. In a rotary engine, the combination, with a revoluble piston secured upon a suitable shaft, the cylinder the periphery of which is formed into valve-securing faces and flanges, of a set of induction-valves secured to the faces, a set of exhaust-valves secured to the flanges, cam-levers hung from each side of the engine to work the induction-valves, a set of arms secured to the shaft upon each side of the cylinder to operate the cam-levers, and the levers for operating the exhaust-valves.

6. In a rotary engine, the combination, with a rotary piston, a shaft secured to and revolved by the piston, and the induction-valves, of the cam-levers pivoted on each side of the engine and connected to the valves, a pair of arms revolved by the shaft on each side of the engine to operate the cam-levers and open the valves, and a pair of cut-off arms revolved by the shaft on each side of the engine and adapted to engage the cam-levers for closing the valves.

7. In a rotary engine, the combination, with a shaft a revoluble piston secured to the shaft, a cylinder having induction and exhaust ports alternating each other in pairs and extending from the inside to the outside of the cylinder, and the blades carried by the piston, of a series of gates one of which intervenes the induction-ports of each pair thereof, cam-levers pivoted upon each side of the cylinder, arms secured to the shaft on each side of the cylinder for operating the cam-levers, and means to withdraw the gates from the cylinder and permit the blades to pass the gates.

8. In a rotary engine, the combination, with a circular cylinder, a rotary piston contained in the cylinder, a shaft upon which the piston is mounted, and the steam-gates, of the induction-valves, the cam-levers pivoted to the faces of the engine and connected to the induction-valves, arms carried by the shaft to operate said levers, and means revolved by the shaft to operate the gates.

9. In a rotary engine, the combination, with the gates, and the followers connected to the gates, of the disks revolved by the engine-shaft, a trip device fixed around the shaft mechanism revolved by the disks and engaged by the trips to extend the gates, and suitable means operating the followers to retract the gates.

10. In a rotary engine, the combination, with the gates, and the followers connected to the gates of a disk secured to the engine-shaft on each side of the engine and revolved in unison by the engine-piston, levers carried by the disks, trip devices fixed in the path of the levers for working the latter, arms swinging from the disk to extend the followers, and suitable means to retract the followers.

11. In a rotary engine, the combination, with a rotary piston having blades revolved in the steam-chamber, and a suitable shaft, gates slidable in the chamber between the induction-ports, cam-levers operated from the shaft to open and close said ports, and the spring-controlled followers attached to the gates, of the disks secured to and revolved by the shaft, arms and levers carried by the disks to slide the gates out of the chamber upon the approach of the blades to the gates, and the trip mechanism to operate the disk-arms and levers.

12. In a rotary engine, the combination, with a rotary piston having blades revolved in the steam-chamber and a suitable shaft, gates slidable into the chamber between the induction-ports, gate-followers, cam-levers operated from the shaft to open and close the ports simultaneously with the passing of the blades over said ports, arms and levers revolved by the shaft, trip devices in the path of these levers to work the latter and have the arms operate the followers to slide the gates out of the chamber, and means to retract the gates.

13. In a rotary engine, the combination, with a series of induction-valves arranged in pairs, a cam-lever connected to each valve and pivoted on the outside of the engine, arms revolved by the engine-shaft to work the cam-levers, the gates, and the followers attached to the gates, of the disks secured to and revolved by the shaft, mechanism carried by the disks and engaging the followers to slide the gates out of the chamber, stationary trips in the path of said mechanism to operate the latter, and suitable springs to retract the followers and slide the gates into the chamber.

14. The combination, with the gates, and the spring-controlled followers connected thereto, of means for sliding them comprising revoluble disks, swinging arms carried by the disks, levers upon the disks having stop-pins to limit the inward swing of the arms, yokes slidable on the disks for giving said arms their outward swing, a double dog to slide the yokes, and fixed trip devices in the path of said levers and the said dog.

15. The combination, with the gates, and the spring-controlled followers connected thereto, of means for sliding them comprising revoluble disks, yokes slidable on the disks and having swinging arms pivoted thereto, double dogs pivoted on the disks and working in the yokes, a trip device fixed in the path of said dogs to slide the yokes, the levers having stop-pins working through the disks, push-pins working through the disks to operate certain of said levers, and a trip device in the path of the push-pins to operate them and the other of said levers.

16. The combination, with the gates, and the spring-controlled followers, connected to the gates, of means for sliding them, comprising revoluble disks, yokes carried by the disks, swinging arms pivoted to the disks and to the yokes, a spring-controlled finger pivoted to the free end of each arm, double dogs pivoted on the disks and connected to the yokes, fixed trip devices in the path of the dogs to have the latter slide the yokes, levers pivoted on the disks and having stop-pins working therethrough for the arms, push-pins working through the disks to operate certain of the levers, and fixed trip devices engaged by a lug on the other of said levers and by the push-pins to operate them.

17. The combination, with the slidable followers, the revoluble swinging arms having pivoted fingers, slidable yokes revolved with the arms and to which the latter are pivoted, and dogs carried by the yokes to slide them, of a trip device comprising a series of spring-pawls in the path of the dogs to work them, and means to revolve the arms in the path of the followers to have said fingers extend the followers.

18. In a rotary engine, the combination, with a circular cylinder, a rotary piston contained in the cylinder, a shaft upon which the piston is mounted, and the steam-gates, of the induction-valves, the cam-levers pivoted to the faces of the engine and connected to the induction-valves, arms carried by the shaft to operate said levers, gate-followers, disks revoluble in the path of the followers, mechanism carried by the disks to slide the followers, and the pawls to trip said mechanism.

19. In a rotary engine the combination, with the induction-valves, the gates intervening the valves and having followers connected thereto, and the cam-levers connected to the said valves, of the revoluble arms and levers operating the cam-levers, the disks revoluble with said arms and levers, devices carried by the disks to operate the followers, and the trips to work said devices.

20. The combination, with the cam-levers, the induction-valves, and the arms for operating them, of the hand-lever cut-offs slidably connected to each cam-lever and adapted to be slid into engagement with said arms to operate the induction-valves.

In testimony whereof I affix my signature in presence of two witnesses.

WILLIAM H. DOWNING.

Witnesses:
WALTER W. LEWIN,
H. E. HECATHORN.